United States Patent [19]
Totani et al.

[11] Patent Number: 5,779,262
[45] Date of Patent: Jul. 14, 1998

[54] CAR INTERIOR FINISH MEMBER WITH AIR BAG COVER

[75] Inventors: Chiharu Totani, Gifu; Shigehiro Ueno; Tetsuya Fujii, both of Aichi; Kenichi Furuta, Gifu, all of Japan

[73] Assignee: Toyoda Gosei Co., Ltd., Aichi-ken, Japan

[21] Appl. No.: 764,022

[22] Filed: Dec. 11, 1996

[30] Foreign Application Priority Data

Dec. 12, 1995 [JP] Japan .................... 7-323281

[51] Int. Cl.⁶ .................................. B60R 21/20
[52] U.S. Cl. ......................... 280/728.3; 280/732
[58] Field of Search ................ 280/728.3, 732, 280/730.1, 728.1, 752

[56] References Cited

U.S. PATENT DOCUMENTS

| | | | |
|---|---|---|---|
| 3,794,349 | 2/1974 | Fuller | 280/732 |
| 5,131,678 | 7/1992 | Gardner et al. | 280/728.3 |
| 5,395,668 | 3/1995 | Ito et al. | 280/728.3 |
| 5,447,328 | 9/1995 | Iannazzi et al. | 280/728.3 |
| 5,487,558 | 1/1996 | Ball et al. | 280/728.3 |
| 5,533,748 | 7/1996 | Wirt et al. | 280/728.3 |

FOREIGN PATENT DOCUMENTS

| | | | |
|---|---|---|---|
| 5-162603 | 6/1993 | Japan . | |
| 5-229367 | 9/1993 | Japan | 280/728.3 |

*Primary Examiner*—Peter C. English
*Attorney, Agent, or Firm*—Cushman Darby & Cushman, IP Group of Pillsbury Madison & Sutro LLP

[57] ABSTRACT

A car interior finish member where a body portion and a cover portion are integrally molded in a shape retaining thermoplastic resin. The cover portion has a hinge portion and a breakable seam which form an air bag developing port when an air bag is operated. A design sheet is molded integrally with the cover portion and has at least an outer skin layer and a barrier layer. The barrier layer is formed of a material thermally fusible with the thermoplastic resin of the body and cover portions. The hinge portion and breakable seam are formed variously by molding of the cover portion and by appropriate notching up to and through the barrier layer of the design sheet.

12 Claims, 2 Drawing Sheets

CAR INTERIOR FINISH MEMBER WITH AIR BAG COVER

BACKGROUND OF THE INVENTION

1. Field of the Invention

The present invention relates to a car interior finish member, that can be employed with an air bag cover, such as an instrument panel, a door trim, a seat back or the like, where an air bag device is installed. The instrument panel is described only by way of example, the present invention is not limited to this single embodiment.

2. Description of the Prior Art

An example of a conventional car interior, an instrument panel, is disclosed in Japanese Patent Publication No. Hei. 5-162603.

The configuration thereof comprises an instrument panel body portion (or interior finish member body portion) and an air bag cover portion. The interior finish member body portion and the air bag cover portion are integrally molded with a shape retaining thermoplastic resin to form an approximately even front surface. The air bag cover portion includes a door portion which opens to release an air bag when the air bag is operated, a hinge portion and a breakable seam formed about the periphery of the door portion. The breakable seam is formed by notching the back surface of the air bag cover portion.

In such an instrument panel, the instrument panel body portion needs to be impact resistant and shape retaining as well as weather resistant and heat resistant.

On the other hand, the breakable portion needs to be strong enough to not produce any crushed pieces, and the hinge portion, which will support the door portion, needs to have a predetermined tensile strength as well as flexibility.

However, in the case where not only the instrument panel body portion but also the cover portion are molded with a fiber-reinforced thermoplastic resin (FRTP), such as fiber-reinforced polypropylene (FRPP) with high bending stiffness and strength in order to ensure shape retention and impact resistance, the frangibility of the breakable seam and the flexibility of the hinge portion can be realized by making them thin, but in that case it becomes difficult to ensure achieving sufficient tensile strength in the hinge portion.

Therefore, in order to ensure proper tensile strength of the hinge portion, a strong, flexible reinforcing material such as a net made of aramide fiber (aromatic polyamide fiber) has been buried in the hinge portion.

However, when such a reinforcing material is used, it is necessary, in molding an instrument panel, for a worker to set, one by one, by hand, a strap-like flexible reinforcing material into a predetermined position of a mold. Accordingly, this increases the number of manufacturing steps of a car interior finish member, such as an instrument panel. This increase in the number of manufacturing steps becomes conspicuous in the case where two hinge portions are required to provide a hinged double-door system.

SUMMARY OF THE INVENTION

Taking the foregoing problems into consideration, the present invention has an object to provide a car interior finish member with an air bag cover which can be manufactured without greatly increasing the number of manufacturing steps yet ensuring both the flexibility and tensile strength of the hinge portion of an air bag door when the air bag is operated.

According to the present invention, the car interior finish member includes an interior finish member body portion, a cover portion for an air bag; and a front design sheet. The cover portion is integrally molded with the interior finish member body portion in a shape retaining thermoplastic resin and forms an approximately even front surface with the interior surface finish member body portion. The cover portion includes a door which, when the air bag is operated, opens to form an air bag port through which the air bag can deploy, a hinge portion and a breakable seam located on the periphery of the door so that the door opens when the air bag is operated. The hinge portion and breakable portion are provided by appropriate forming and notching of the back surface of the cover portion. The design sheet is integrally molded as an insert onto the front surface of the cover portion and the front surface of the interior finish member body portion. The design sheet has at least a skin layer and a barrier layer which is made of a material thermally fusible with the thermoplastic resin of the interior finish member body portion, and the breakable portion is provided by further notching the barrier layer so as to cut away the barrier layer.

In the car interior finish member according to the present invention, the barrier layer has considerable strength thereby providing the same effect as the above-mentioned aramide reinforcing net. By providing the barrier layer and notching into that barrier layer to form the breakable seam after molding, it is not only possible to make sure of the strength of the hinge portion in the cover portion, but it is also possible to ensure the frangibility of the breakable seam.

Therefore, the car interior finish member can be manufactured without greatly increasing the number of manufacturing steps while ensuring both the flexibility and tensile strength of the hinge portion of an air bag door when an air bag is operated.

DETAILED DESCRIPTION OF THE PREFERRED EMBODIMENT

An embodiment of the present invention will be described with reference to the drawings.

Instrument Panel

Figure 1:
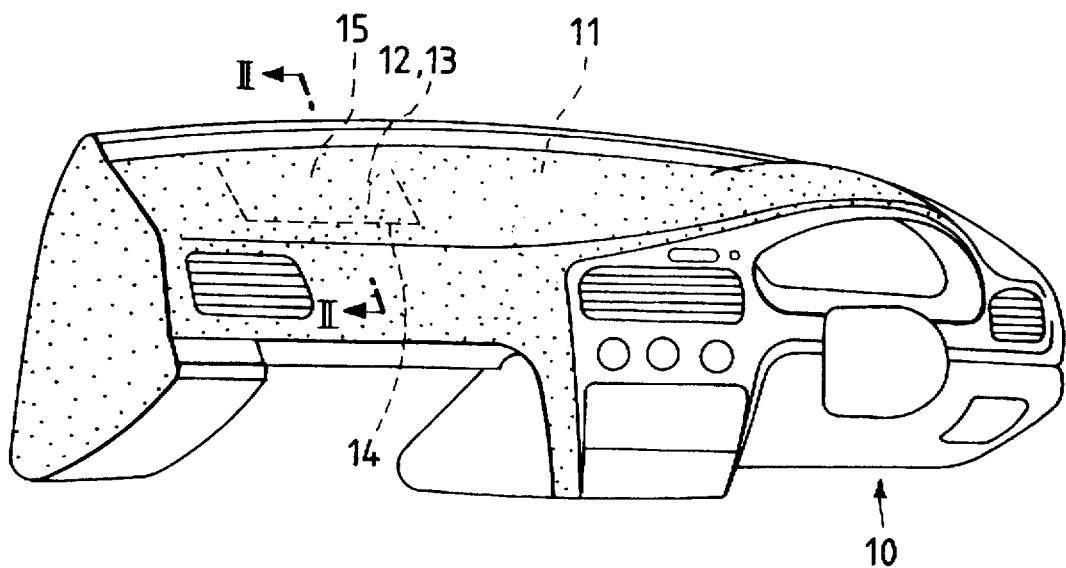
FIG. 1 is a perspective view of an instrument panel according to the present invention.
Figure 3:
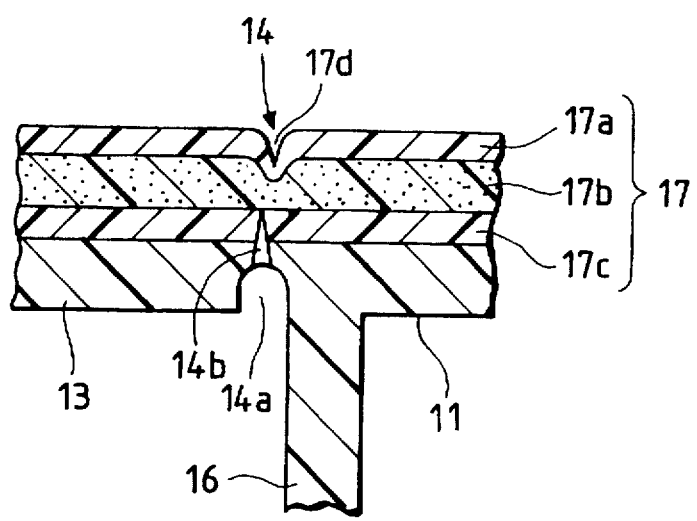
FIG. 3 is an enlarged detailed cross-sectional view of portion III in FIG. 2.
Figure 2:
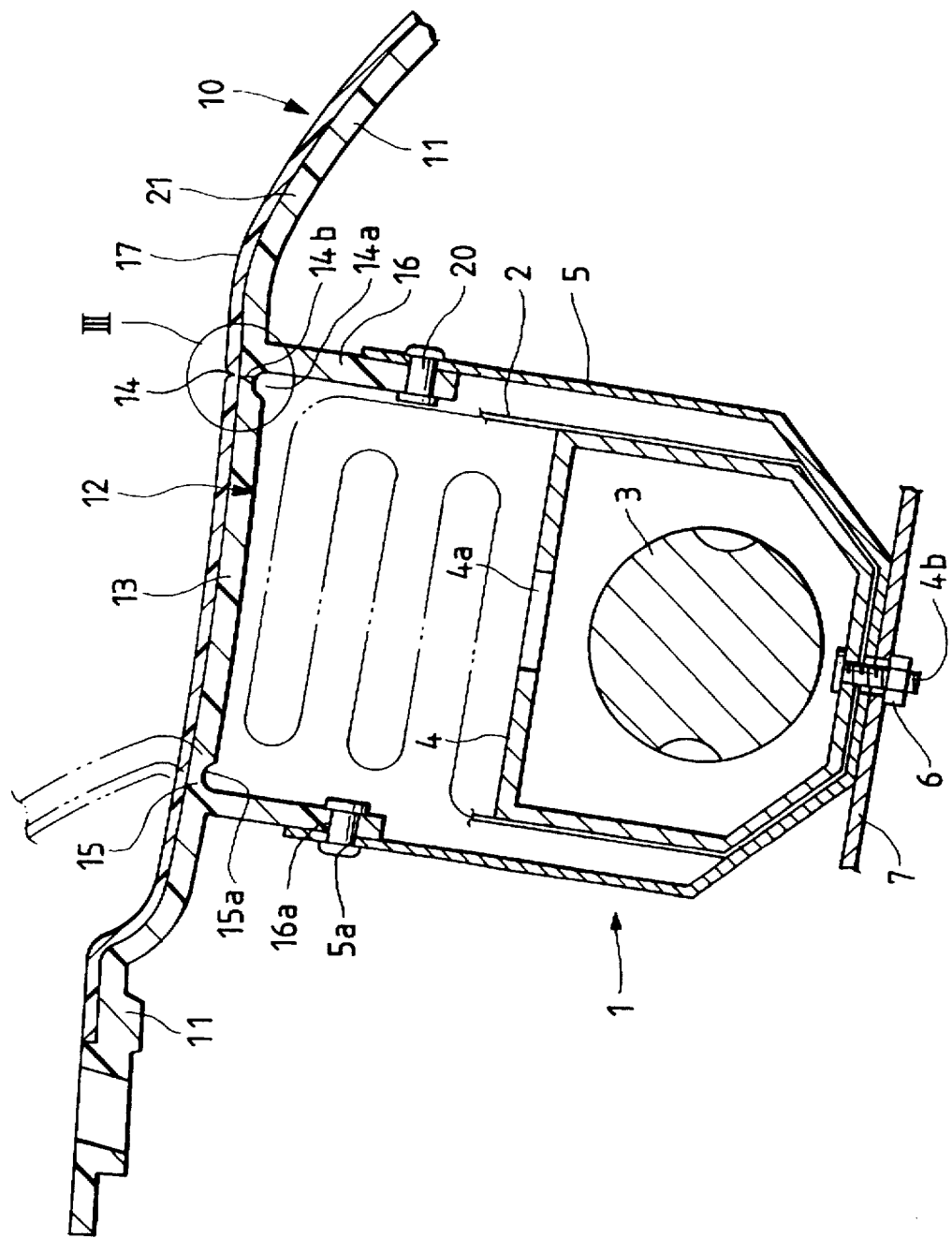
FIG. 2 is a partial cross-sectional view taken along the line II—II in FIG. 1.

A car interior finish member, in this embodiment, as shown in FIGS. 1 to 3, is an instrument panel 10 and comprises a body portion 11, and a cover portion 12, which is surrounded by the body portion 11 and continued to the body portion 11 so as to have its front surface even with that of body portion 11 and to cover a folded air bag 2 of an air bag device 1.

The air bag device 1 has the air bag 2 stored in a folded state, a cylinder-type inflator 3 for feeding inflating gas to the air bag 2, a cylindrical diffuser 4 for diffusing and flushing the gas from the inflator 3 into the air bag 2, and a box-like case 5 covering the air bag 2, the inflator 3 and the diffuser 4.

A gas flow hole 4a is provided centrally of diffuser 4 to diffuse and flush the gas from the inflator 3 into the air bag 2. A plurality of bolts 4b project downwardly from the bottom of diffuser 4 as in FIG. 2. These bolts 4b are fastened by nuts 6 to integrate the case 5, the air bag 2 and the diffuser 4 with each other and to fixedly attach the air bag device 1 to a bracket 7, provided so as to project from a frame of a vehicle. A plurality of fitting holes 5a are formed in the circumferential wall of case 5.

The cover portion 12 has a door or door portion 13, for covering the folded air bag 2. A thin breakable portion or seam 14 is formed by recessing the back surface of the door 13. Seam 14 breaks when the air bag 2 expands. A hinge portion 15 couples the door 13 and the body portion 11 and acts as a center part of the rotation of the door 13 when the breakable seam 14 breaks.

Although the breakable seam 14 is formed in a U-shaped channel when viewed from above and the hinge portion 15 is disposed in a portion between the open ends of the U-shaped channel to open on one side only in this embodiment, the breakable seam 14 may be formed with an H-shape to provide a structure that opens on two sides.

In addition, a mounting wall 16 extended in the form of a square pillar projects downwardly from the outer circumferential edge on the back side of the cover portion 12. Fitting holes 16a are formed in the mounting wall 16 corresponding to the fitting holes 5a of the case 5 of the air bag device 1.

The instrument panel body portion 11 and the cover portion 12 are integrally molded with a FRTP such as FRPP. The instrument panel body portion 11 is molded in a material with a modulus of elasticity not less than 2,000 MPa to ensure rigidity.

Design Sheet

A design sheet 17 is integrally molded onto the front surface of the instrument panel body portion 11 and the cover portion 12 in the instrument panel 10 in this embodiment. This design sheet 17 has at least an outer skin layer 17a and an interior barrier layer 17c. Generally, the design sheet 17 has a three-layer structure in which a foaming layer 17b is interposed between the outer skin and barrier layers to thereby improve the tactile qualities of the design sheet.

The barrier layer 17c is formed of a material which is thermally fusible with the hard thermoplastic resin making up the basic bodies (the body portion 11 and the cover portion 12). For example, when the basic bodies are made of a non-polar thermoplastic resin, the barrier layer 17c is also made of non-polar thermoplastic resin. On the other hand, when the basic bodies are made of a polar thermoplastic resin, the barrier layer 17c is also made of polar thermoplastic resin.

Specifically, the design sheet 17 includes an outer skin layer 17a made of a soft vinyl chloride or olefinic thermoplastic elastomer (TPE) with superior tactile qualities, a foaming layer 17b disposed on the back surface of the outer skin layer 17a and made of foaming polypropylene, and a barrier layer 17c disposed on the back surface of the foaming layer 17b and made of a styrenic TPE or olefinic TPE. The barrier layer 17c is provided to protect the foaming layer 17b from the pressure and heat of injected material when the body portion 11 and the cover portion 12 are formed by injection molding.

When the basic bodies (the body portion 11 and the cover portion 12) are made of FRPP, the barrier layer 17c is made of compatible non-polar olefinic or styrenic TPE. Examples of olefinic TFE's include PP (homo-polypropylene or ethylene/propylene block copolymer) with rubber (FPR (ethylene-propylene rubber) or EPDM (ethylene-propylene-diene methylene linkage)). Examples of the styrenic TPE include styrene/ethylene/butylene block copolymer (SEBS), styrene/isoprene block copolymer (SIS), styrene/butadiene block copolymer (SBS), styrene/ethylene/propylene block copolymer (SEPS).

The thickness of the design sheet 17 is made to be from about 0.8 to about 6.2 mm. The thickness of the outer skin layer 17a, the foaming layer 17b, and the barrier layer 17c are made to be from about 0.4 to about 0.7 mm, from about 0 to about 4.0 mm, and from about 0.4 to about 1.5 mm, respectively. The thickness of the cover portion 12 is, for example, made to be about 3.5 mm.

Further, in this embodiment, a shallow groove is notched into the back surface of the hinge portion 15 to make the hinge action smooth, and a groove is notched extending through the barrier layer 17c in the breakable seam 14.

Specifically, a concave groove 15a is formed during injection molding on the back surface of hinge portion 15. The rest of the cover portion 12 in the hinge portion 15 is made to be from about 2.5 to about 3.2 mm thick. Likewise a concave groove 14a is formed on the back surface of the breakable seam 14 by injection molding. Secondary notching is performed by cutting a non-continuous slit 14b by means of an ultrasonic welder, a blade, or the like, after molding. For example, the non-continuous slit 14b is cut for about 9 mm, then uncut for about 3 mm, and so forth.

Manufacture

The instrument panel 10 in the above-mentioned embodiment is manufactured in the conventional manner. The design sheet 17, prepared in advance by vacuum forming is set into a split die metal mold, and the material for the basic bodies 11 and 12 is injected into a product cavity formed by the closed mold. The material is hardened and then trimmed after mold opening and separating.

Installed in a vehicle, the instrument panel 10 is attached with rivets 20 through the fitting holes 5a and 16a to the upper circumferential wall of case 5 of the air bag device 1. Bracket 7 is attached with bolts 4b screwed down by nuts 6. The other end of bracket 7 is fixed to a frame, so that the air bag device 1 can be coupled with the instrument panel 10 and installed in the vehicle. Predetermined meters are disposed in the instrument panel 10 when the instrument panel 10 is installed in the vehicle.

Gas ejected from inflator 3 at a designated time is introduced into air bag 2 through the gas flow hole 4a of diffuser 4. Thus air bag 2 inflates, breaking both the breakable seam 14 and a concave portion 17d formed on the front surface of the outer skin layer 17a of design sheet 17 opening the door 13 centered on hinge portion 15.

As described above, the instrument panel body portion 11 and the cover portion 12 are made of a fiber reinforced thermoplastic resin. The hinge portion 15 forming the door 13 of the cover portion 12 is provided by molding the back surface of the cover portion 12. In addition, the breakable seam 14 is provided by both molding the back surface of the cover portion 12 and by notching through the barrier layer 17c of the design sheet 17. The barrier layer 17c is formed of a material thermally fusible with the molding material of the body portion 11 and the cover portion 12 and thus has a high bonding power and does not separate from the basic bodies.

The basic bodies are preferably made with a material with a modulus of elasticity of about 1,000 to 3,000 MPa. The barrier layer (about 0.3 to 2 mm thick) of the design sheet is preferably composed of material with a tensile strength from about 10 to about 50 MPa and an expansion factor from about 50 to 200%. When FRPP (tensile strength: 22 MPa, modulus of elasticity: 2,195 MPa, Rockwell hardness (R): 76) was used as the basic body material, and olefin TPE (tensile strength: 34.5 MPa, expansion factor: 90%, tear strength: 103N, hardness: Shore D55) was used for the barrier layer (1.0 mm) of the design sheet material, the separation strength between the basic body and the barrier layer was about 20N/25 mm (as measured by JIS K 6256; equivalent to ISO 6133 (1981)).

When the instrument panel 10 is molded, it is not necessary to set flexible reinforcing material into a predetermined position in the mold, thus molding can be automated, and the instrument panel 10 can be manufactured easily.

Although an instrument panel was described in this embodiment the present invention can be applied to any other car interior finish members, such as door trim, a seat back, and so on, to cover an air bag in an air bag device.

What is claimed is:

1. A car interior finish member comprising:

an interior member body portion;

a cover portion for an air bag integrally molded with said interior member body portion in a shape retaining thermoplastic resin so as to have an approximately even front surface, wherein said cover portion includes:
a door which opens to form an air bag port when said air bag is operated,
a hinge portion, and
a breakable seam formed about a peripheral portion of said door;

a design sheet integrally molded onto a front surface of said cover portion thereby forming a front surface of said interior member body portion;

wherein said design sheet has at least an outer skin layer and an interior barrier layer, said barrier layer comprising a material thermally fusible with said thermoplastic resin, and a breakable portion being defined by a notch extending through said barrier layer, wherein a foaming layer is interposed between said outer skin layer and said barrier layer in said design sheet, and wherein said thermoplastic resin forming said body portion is fiber-reinforced polypropylene, and said barrier layer material is selected from the group consisting of olefinic and styrenic thermoplastic elastomers.

2. The car interior finish member according to claim 1, wherein a concave portion is formed on a front surface of said outer skin layer at said breakable seam.

3. The car interior finish member according to claim 2, wherein said hinge portion is provided by notching a back surface of said cover portion.

4. The car interior finish member according to claim 1, wherein said hinge portion is provided by notching a back surface of said cover portion.

5. A car interior finish member comprising:

an interior member body portion;

a cover portion for an air bag integrally molded with said interior member body portion in a shape retaining thermoplastic resin so as to have an approximately even front surface, wherein said cover portion includes:
a door which opens to form an air bag port when said air bag is operated,
a hinge portion, and
a breakable seam formed about a peripheral portion of said door;

a design sheet integrally molded onto a front surface of said cover portion thereby forming a front surface of said interior member body portion;

wherein said design sheet has at least an outer skin layer and an interior barrier layer, said barrier layer comprising a material thermally fusible with said thermoplastic resin, and a breakable portion being defined by a notch extending through said barrier layer, wherein a foaming layer is interposed between said outer skin layer and said barrier layer in said design sheet, and wherein said interior finish member body portion, said cover portion and said barrier layer are made of polar thermoplastic resin.

6. The car interior finish member according to claim 5, wherein a concave portion is formed on a front surface of said outer skin layer at said breakable seam.

7. The car interior finish member according to claim 6, wherein a hinge portion is provided by notching a back surface of said cover portion.

8. The car interior finish member according to claim 5, wherein said hinge portion is provided by notching a back surface of said cover portion.

9. A car interior finish member comprising:

an interior member body portion;

a cover portion for an air bag integrally molded with said interior member body portion in a shape retaining thermoplastic resin so as to have an approximately even front surface, wherein said cover portion includes:
a door which opens to form an air bag port when said air bag is operated,
a hinge portion, and
a breakable seam formed about a peripheral portion of said door;

a design sheet integrally molded onto a front surface of said cover portion thereby forming a front surface of said interior member body portion;

wherein said design sheet has at least an outer skin layer and an interior barrier layer, said barrier layer comprising a material thermally fusible with said thermoplastic resin, and a breakable portion being defined by a notch extending through said barrier layer, wherein a foaming layer is interposed between said outer skin layer and said barrier layer in said design sheet, and wherein said interior finish member body portion, said cover portion and said barrier layer are made of non-polar thermoplastic resin.

10. The car interior finish member according to claim 9, wherein a concave portion is formed on a front surface of said outer skin layer at said breakable seam.

11. The car interior finish member according to claim 10, wherein said hinge portion is provided by notching a back surface of said cover portion.

12. The car interior finish member according to claim 9, wherein said hinge portion is provided by notching a back surface of said cover portion.

* * * * *